(12) United States Patent
Kato et al.

(10) Patent No.: US 7,436,898 B2
(45) Date of Patent: Oct. 14, 2008

(54) INTEGRATED CIRCUIT (IC) CARD, DATA TRANSMISSION APPARATUS, DATA TRANSMISSION METHOD AND COMPUTER PROGRAM OF DATA TRANSMISSION METHOD

(75) Inventors: Isao Kato, Hirakata (JP); Tatsuya Adachi, Neyagawa (JP); Kazuya Iwata, Katano (JP); Tetsushi Kasahara, Katano (JP); Seiji Nakamura, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 884 days.

(21) Appl. No.: 10/496,938

(22) PCT Filed: Oct. 14, 2003

(86) PCT No.: PCT/JP03/13139

§ 371 (c)(1),
(2), (4) Date: May 25, 2004

(87) PCT Pub. No.: WO2004/036440

PCT Pub. Date: Apr. 29, 2004

(65) Prior Publication Data

US 2005/0053095 A1  Mar. 10, 2005

(30) Foreign Application Priority Data

Oct. 16, 2002 (JP) ............................. 2002-302259

(51) Int. Cl.
*H04L 27/00* (2006.01)
(52) U.S. Cl. ........................................ 375/295; 370/470
(58) Field of Classification Search ............... 375/295; 370/470
See application file for complete search history.

(56) References Cited

U.S. PATENT DOCUMENTS 6,256,762 B1  7/2001  Beppu (Continued)

FOREIGN PATENT DOCUMENTS

EP  1 211 602 A2  6/2002

(Continued)

OTHER PUBLICATIONS

MMCA Technical Committee, "The Multimedia Card", Version 2.2, pp. 1-27, (2000).

(Continued)

*Primary Examiner*—Mohammad Ghayour
*Assistant Examiner*—Juan A. Torres
(74) *Attorney, Agent, or Firm*—Panitch Schwarze Belisario & Nadel LLP (57) ABSTRACT

An integrated circuit (IC) card capable of a high-speed data transmission to/from a data transmission apparatus having low processing capability. A controlling section generates a data packet by adding management information including information regarding a data length of the data packet, and divides the data packet to generate data blocks. The data length of the data block is designated from the data transmission apparatus. When the data blocks which compose the single data packet are sent to the transmission apparatus a communicating section sends an interrupt signal to the data transmission apparatus if the data block including the management information is to be sent, and does not send the interrupt signal to the data transmission apparatus if a data block not including the management information is to be sent.

18 Claims, 7 Drawing Sheets

U.S. PATENT DOCUMENTS

| | | | |
|---|---|---|---|
| 6,920,145 B2 * | 7/2005 | Matsuoka et al. | 370/412 |
| 7,161,940 B2 * | 1/2007 | Jinzaki | 370/390 |
| 2002/0065044 A1 | 5/2002 | Ito | |

FOREIGN PATENT DOCUMENTS

| | | | |
|---|---|---|---|
| JP | 63-137349 A | | 6/1988 |
| JP | 01-213774 A | | 8/1989 |
| JP | 1-213774 A | | 8/1989 |
| JP | 01213774 | * | 8/1989 |
| JP | 03-242781 A | | 10/1991 |
| JP | 3-242781 A | | 10/1991 |
| JP | 03242781 | * | 10/1991 |
| JP | 05035624 A | * | 2/1993 |
| JP | 10-27231 A | | 1/1998 |
| JP | 10-027231 A1 | | 1/1998 |
| JP | 2002-171303 A | | 6/2002 |
| WO | WO 98/33112 A1 | | 7/1998 |

OTHER PUBLICATIONS

Intel Application Note, "Using SDCard and SDIO with the Intel PXA250 Applications Processor MMC Controller", pp. 1-15, (2002).

"SD Card Specification Simplified Version of Part E1. Secure Digital Input/Output (SDIO) Card Specification", pp. 1-20E, (2001).

* cited by examiner

INTEGRATED CIRCUIT (IC) CARD, DATA TRANSMISSION APPARATUS, DATA TRANSMISSION METHOD AND COMPUTER PROGRAM OF DATA TRANSMISSION METHOD

CROSS-REFERENCE TO RELATED APPLICATIONS

This application is a section 371 of International Application No. PCT/JP03/13139, filed Oct. 14, 2003, the disclosure of which is incorporated herein by reference.

TECHNICAL FIELD

The present invention relates to an IC card, a data transmission apparatus, a data transmission method and a computer program of data transmission method.

BACKGROUND ART

In recent years, an IC card equipped with a non-volatile memory and other functions was developed, and has spread through the market. For example, a technique of mounting an IC card equipped with a flash memory and a television broadcast receiving function on a PDA (Personal Digital Assistants), transmitting the visual data and the audio data which the IC card received to the PDA, and outputting it from the PDA display and the speaker, is about to be realized.

Generally, data transmission between a main unit of an equipment (will refer to as a "data transmission apparatus" in this description) and an IC card is executed in a master/slave mode communication in which the data transmission apparatus is assumed as master. Conventionally, the data transmission apparatus executed a request-to-send and a confirmation of receipt for each data that is to be a transmission unit when reading out data from the IC card.

An IC card of the conventional art in accordance with the Official Gazette of Japanese Unexamined Patent Publication Hei 10-27231 divides data into a plurality of blocks corresponding to the size of a receiving buffer of a terminal (data transmission apparatus). Then, the IC card further divides the block into data with the size of a sending buffer of its own, and sends the data sequentially to the terminal. The terminal sends a "continuation data demanding block" to the IC card each time the terminal receives all the data which composes a single block. The IC card of the conventional art can transmit data to the terminal in high-speed when the IC card has the sending buffer which is smaller in size than the size of the receiving buffer of the terminal.

As the intended use of the IC card expands to equipments in which its memory capacity of a buffer memory for a two-way transmission is small, and its processing capability is low, the need to use a more effective and high-speed data transmission method rose.

In the IC card of the conventional art in accordance with the Official Gazette of Japanese Unexamined Patent Publication Hei 10-27231, the communication speed was extremely slow when the size of the sending buffer is larger than the size of the receiving buffer of the data transmission apparatus. In such a case, the IC card of the conventional art divided the data packet into a plurality of blocks wherein the size of the block is equal to or smaller than the size of a receiving buffer of the terminal. The terminal sends the "continuation data demanding block" to the IC card, each time the terminal receives one block. Since there is a need to confirm whether the transmission between the terminal and the IC card was executed normally whenever a block is transmitted, its communication speed was slow. Such data transmission method placed heavy burden on an audiovisual equipment such as a digital camera and the like, which is low in processing capability.

The present invention solves the above-mentioned conventional problems, and aims to provide an IC card, a data transmission apparatus, a data transmission method and a computer program of data transmission method that can transmit data in high-speed between an IC card and a data transmission apparatus even when the processing capability of the data transmission apparatus is low.

Furthermore, it aims to provide an IC card, a data transmission apparatus, a data transmission method and a computer program of data transmission method that can transmit data corresponding to the memory capacity of a buffer memory for a two-way transmission of a data transmission apparatus.

DISCLOSURE OF INVENTION

In order to solve the above-mentioned problems, the present invention has the following configurations. An IC card in accordance with the present invention from one aspect comprises: a controlling section which generates a data packet by adding management information including information regarding a data length of the data packet, and which generates data blocks by dividing the above-mentioned data packet wherein a data length of the data packet is designated from a data transmission apparatus; and a communicating section which sends an interrupt signal to the above-mentioned data transmission apparatus when the above-mentioned data block which includes the above-mentioned management information is to be sent, and does not send the above-mentioned interrupt signal to the above-mentioned data transmission apparatus when a data block which does not include the above-mentioned management information is to be sent, in a case where a plurality of the above-mentioned data blocks, which compose the single above-mentioned data packet, are sent to the above-mentioned data transmission apparatus.

For example, when an IC card having a radio communication function receives a data from an external source, the IC card must promptly send the received data to the data transmission apparatus. By the IC card sending the interrupt signal to the data transmission apparatus, the data transmission apparatus can, corresponding to the signal, quickly receive the data from the IC card and process that data. However, an interrupting process places a heavy burden on the data transmission apparatus, since it typically must be executed by interrupting the process which the data transmission apparatus is presently executing.

According to the present invention, the data transmission apparatus acknowledges from the interrupt signal that an IC card is demanding a data transmission, and can quickly start the data transmission. The data transmission apparatus can judge the amount of information (data length) the data packet has, by extracting the information regarding the data length of the data packet from the data block which was primarily received. The data transmission apparatus can judge the presence or absence of a data block which is not yet received, from the data length of a data packet and the data length of a first data block which is already received. Based on that judgment, the data transmission apparatus can execute the necessary data transmission even without receiving the interrupt signal thereafter. The burden on the data transmission apparatus to process a data will become small when the IC card does not send the interrupt signal regarding the transmission of the second through last data blocks.

The present invention has an action of realizing an IC card capable of high-speed data transmission to/from a data transmission apparatus (even to/from a data transmission apparatus whose information processing capability is low), without imposing a heavy burden of information processing on a data transmission apparatus.

In regard to an IC card in accordance with the present invention from another aspect, the above-mentioned controlling section makes the foremost data block include the above-mentioned management information, in a case where a plurality of the above-mentioned data blocks, which compose the single above-mentioned data packet, are sent to the above-mentioned data transmission apparatus.

The present invention has an action of realizing an IC card capable of transmitting data to/from a data transmission apparatus, without imposing a heavy burden of information processing on a data transmission apparatus.

An IC card in accordance with the present invention from another aspect disposes the above-mentioned sent data packet after receiving information of normally receiving all above-mentioned data blocks, which compose the above-mentioned data packet, from the above-mentioned data transmission apparatus, or after receiving a command other than a command of sending the above-mentioned data packet from the above-mentioned data transmission apparatus, in a case where the above-mentioned data packet which is divided into a plurality of the above-mentioned data blocks is sent to the above-mentioned data transmission apparatus. When a data transmission fails amid sending a plurality of data blocks to a data transmission apparatus, an IC card of the present invention can re-send the data packet.

A data transmission apparatus in accordance with the present invention from another aspect comprises a communicating section which sends and receives a data block to/from an IC card, and a controlling section, in case a plurality of the above-mentioned data blocks created by dividing a data packet are received from the IC card, which extracts-management information including the information regarding the data length of the above-mentioned data packet from the pre-determined portion of the above-mentioned data block which is primarily received after the above-mentioned communicating section receives an interrupt signal, and treats the whole above-mentioned data block as a data that does not include the above-mentioned management information in a case where the above-mentioned data block is received at other timing.

The present invention has an action of realizing a data transmission apparatus capable of transmitting data in high-speed to/from an IC card of the present invention, without need of a high processing capability.

A data transmission apparatus in accordance with the present invention from another aspect further comprises a buffer memory for a two-way transmission which stores the above-mentioned data block that is sent and received to/from the above-mentioned IC card; the above-mentioned communicating section receives the information of the maximum size of the data block which the above-mentioned IC card can send and receive before the above-mentioned data block is sent and received to/from the above-mentioned IC card; and the above-mentioned controlling section determines a maximum size of the above-mentioned data block corresponding to the above-mentioned buffer memory for a two-way transmission and the maximum size of the data block which the above-mentioned IC card can send and receive, and commands the above-mentioned IC card to send the above-mentioned data blocks with a data length that is equal to or smaller than the maximum size of the above-mentioned data block through the above-mentioned communicating section in a case where the plurality of the above-mentioned data blocks from the above-mentioned IC card are received wherein the data blocks are created by dividing the above-mentioned data packet.

"Information of the maximum size of the data block which can be sent and received" is typically a memory capacity of a buffer memory for a two-way transmission. Generally, an IC card and a data transmission apparatus transmit data after storing a data block in a buffer memory for a two-way transmission. The size of a buffer memory for a two-way transmission varies by an IC card and a data transmission apparatus. For example, a buffer memory for a two-way transmission of a cellular phone is small, and a buffer memory for a two-way transmission of a personal computer is large compared to it. The larger the maximum size of the data block is, the higher the data transmission efficiency becomes. However, when the maximum size of a data block becomes larger than that of the buffer memory for a two-way transmission of a data transmission apparatus or an IC card, data transmission will be placing an extremely heavy burden on the data transmission apparatus and the IC card. A data transmission apparatus in accordance with the present invention has an action of realizing a data transmission apparatus capable of pre-determining the maximum size of a data block corresponding to an IC card and a data transmission apparatus (for example, corresponding to the sizes of their buffer memories for a two-way transmission), and executing data transmission.

The present invention is particularly useful in an IC card or a data transmission apparatus (for example, a portable equipment such as a cellular phone and the like), in which the memory capacity of a buffer memory for a two-way transmission is small, and its capacity varies by the model.

The present invention has an action of realizing a data transmission apparatus capable of transmitting data in high-speed to/from an IC card of the present invention, without need of a high processing capability.

In the above-mentioned data transmission apparatus in accordance with the present invention from another aspect, the above-mentioned controlling section judges whether all the above-mentioned data blocks are received or not based on the information regarding the data length of the above-mentioned data packet included in the extracted above-mentioned management information and commands the above-mentioned IC card to send the above-mentioned data block when there is the above-mentioned data block which has not been received, in a case where a plurality of data blocks created by dividing the above-mentioned data packet are received from the above-mentioned IC card.

In the above-mentioned data transmission apparatus in accordance with the present invention from another aspect, the above-mentioned controlling section does not notify the above-mentioned IC card individually that each of the above-mentioned data block has been received normally when the above-mentioned data block is received normally, but notifies the above-mentioned IC card that the above-mentioned communicating section has normally received the whole data packet at the time when all of the above-mentioned data blocks which compose the data packet were normally received, in a case where the above-mentioned communicating section receives a plurality of data blocks which compose the single above-mentioned data packet from the above-mentioned IC card.

The present invention has an action of realizing a data transmission apparatus capable of transmitting data in high-speed to/from an IC card, without placing a heavy burden of information processing on a data transmission apparatus, by omitting the handshaking in the transmission of the individual above-mentioned data block.

In the above-mentioned data transmission apparatus in accordance with the present invention from another aspect, the above-mentioned controlling section, when the above-mentioned communicating section detects an error from the data block which the above-mentioned IC card has sent, cancels the transmission of the remaining data block belonging to the same data packet, and sends said IC card a command to re-send that data packet.

The present invention has an action of realizing a data transmission apparatus capable of transmitting data efficiently to/from an IC card, without placing a heavy burden of information processing on a data transmission apparatus.

A data transmission apparatus in accordance with the present invention from another aspect comprises: a controlling section which generates a data packet by adding the management information including the information regarding a data length of the data packet, and which divides the above-mentioned data packet to generate data blocks wherein a data length of the data block is equal to or smaller than the pre-determined size; and a communicating section which primarily sends the above-mentioned data block including the above-mentioned management information and then sends the data block which does not include the above-mentioned management information, in a case where the above-mentioned data packet is sent to an IC card after a function validity notice that the above-mentioned IC card can receive the above-mentioned data block is received from the above-mentioned IC card.

The present invention has an action of realizing a data transmission apparatus capable of efficiently transmitting data to/from an IC card, without placing a heavy burden of information processing on a data transmission apparatus.

A data transmission method and a computer program of data transmission method in accordance with the present invention from another aspect is based on the same technical philosophy as that of the above-mentioned IC card and data transmission apparatus.

The present invention has an action of realizing a data transmission method and a computer program of data transmission method that is capable of transmitting data in high-speed between an IC card and a data transmission apparatus even when the processing capability of the data transmission apparatus is low.

The present invention has an action of realizing a data transmission method and a computer program of data transmission method that is capable of transmitting data corresponding to the memory capacities of buffer memories for a two-way transmission of an IC card and a data transmission apparatus.

While the novel features of the invention are set forth particularly in the appended claims, the invention, both as to organization and content, will be better understood and appreciated, along with other objects and features thereof, from the following detailed description taken in conjunction with the drawings.

Part or all of the drawings are drawn schematically for diagrammatic representation and it should be considered that they do not necessarily reflect relative size and position of components shown therein.

BEST MODE FOR CARRYING OUT THE INVENTION

Embodiments that specifically show the best mode for conducting the present invention will be described below with reference to figures.

An IC card, a data transmission apparatus, a data transmission method and a computer program of data transmission method in accordance with the embodiment will be described with reference to FIG. 1 through FIG. 7.

Figure 1:
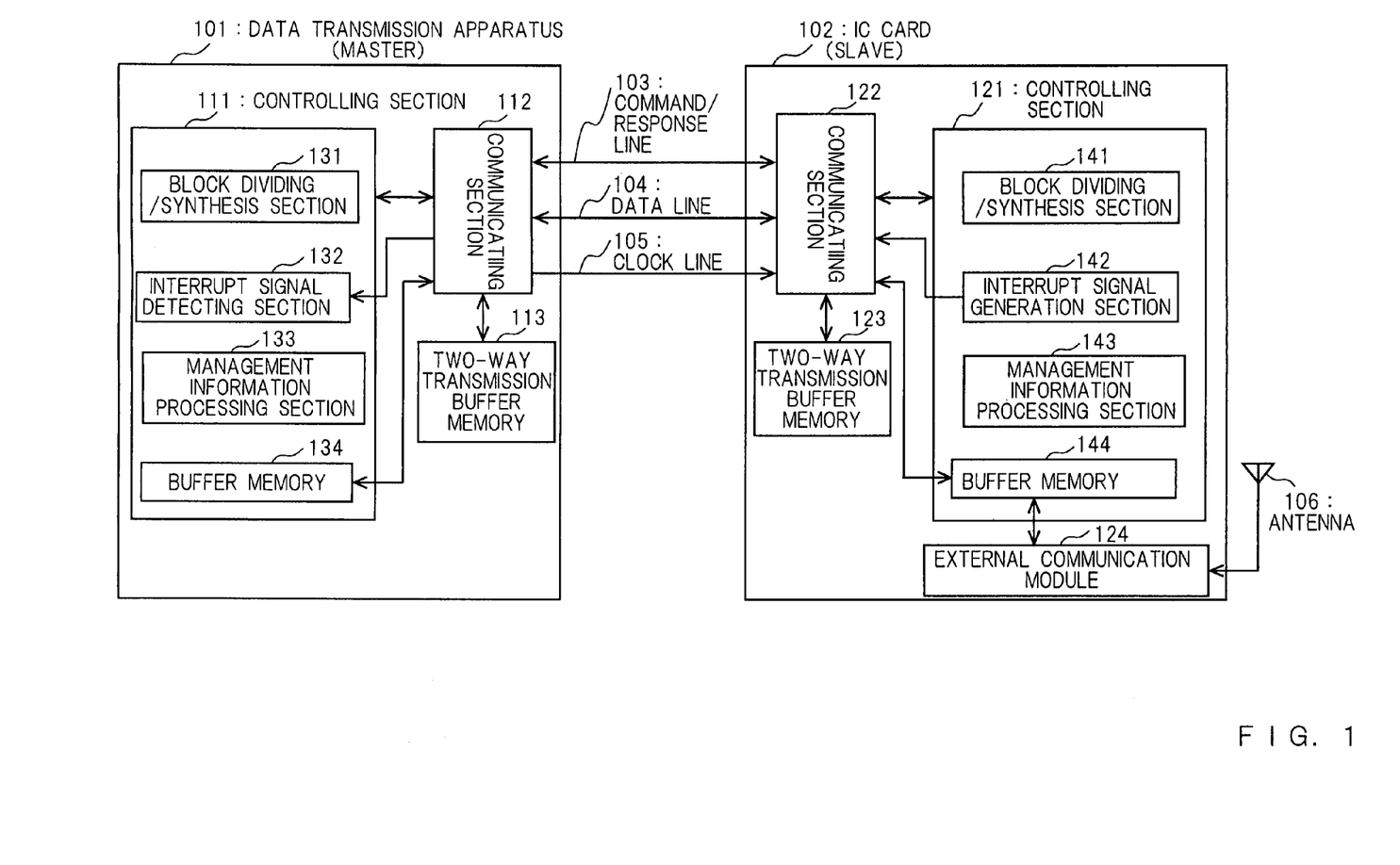
FIG. 1 is a block diagram of a data transmission apparatus and an IC card in accordance with the embodiment of the present invention.

FIG. 1 shows the configuration of a data transmission apparatus and an IC card in accordance with the embodiment of the present invention. In FIG. 1, a reference numeral 101 denotes a data transmission apparatus, and a reference numeral 102 denotes an IC card.

The data transmission apparatus 101 is arbitrary equipment having a card slot (not shown) for inserting an IC card 102. The data transmission apparatus 101 of the embodiment is a cellular phone. The IC card 102 may be an arbitrary general-purpose IC card. The IC card 102 of the embodiment is an SD card. The IC card 102 is inserted in the card slot of the data transmission apparatus 101.

The data transmission apparatus 101 has a controlling section 111, a communicating section 112 and a buffer memory for a two-way transmission 113. The controlling section 111 has a block dividing/synthesis section 131, an interrupt signal detecting section 132, a management information processing section 133 and a buffer memory 134. In regard to the embodiment, the controlling section 111 is a microcomputer, and the function of the block dividing/synthesis section 131 and the management information processing section 133 is executed by software.

The IC card 102 has a controlling section 121, a communicating section 122, a buffer memory for a two-way transmission 123 and an external communication module 124. The controlling section 121 has a block dividing/synthesis section 141, an interrupt signal generating section 142, a management information processing section 143 and a buffer memory 144. In regard to the embodiment, the controlling section 121 is a microcomputer, and the function of the block dividing/synthesis section 141 and the management information processing section 143 and the start-up process of the interrupt signal generating section 142 are executed by software. The external communication module 124 is electrically connected to an external antenna 106, and executes a radio communication with the external apparatus (not shown).

The communicating section 112 of the data transmission apparatus 101 and the communicating section 122 of the IC card 102 executes a synchronous mode communication through a command/response line 103, a data line 104 and a clock line 105. The communication is a master/slave mode communication in which the data transmission apparatus 101 is assumed as master, and the IC card 102 is assumed as slave.

The external communication module 124 of the IC card 102 receives a data packet by radio communication (a data packet of a Bluetooth standard, in the embodiment) through the antenna 106, and transmits it to the buffer memory 144. The IC card 102 generates a data packet to be sent to the data transmission apparatus 101 (a data packet of a SD I/O Bluetooth standard, in the embodiment) from the data packet in the buffer memory 144, divides it into a plurality of data blocks, and transmits them to the data transmission apparatus 101. A data block being sent and received to/from the data transmission apparatus 101 is stored sequentially in the buffer memory for a two-way transmission 123. The IC card 102 may have a plurality of a functional blocks (for example, a non-volatile memory and a tuner section which receives a video signal and/or an audio signal).

The data transmission apparatus 101 generates a data packet (a data packet of a SD I/O Bluetooth standard, in the embodiment) to be sent to the IC card 102 from a data packet (a data packet of a Bluetooth standard, in the embodiment) memorized in the buffer memory 134, divides it into a plurality of data blocks, and sends them to the IC card 102. A data blocks sent and received to/from the IC card 102 are stored sequentially in the buffer memory for a two-way transmission 113.

<<Configuration of a Data Packet and a Data Block>>

A configuration of a data packet and a data block which is sent and received between the data transmission apparatus 101 and the IC card 102 will be described with reference to FIG. 2.

Figure 2:
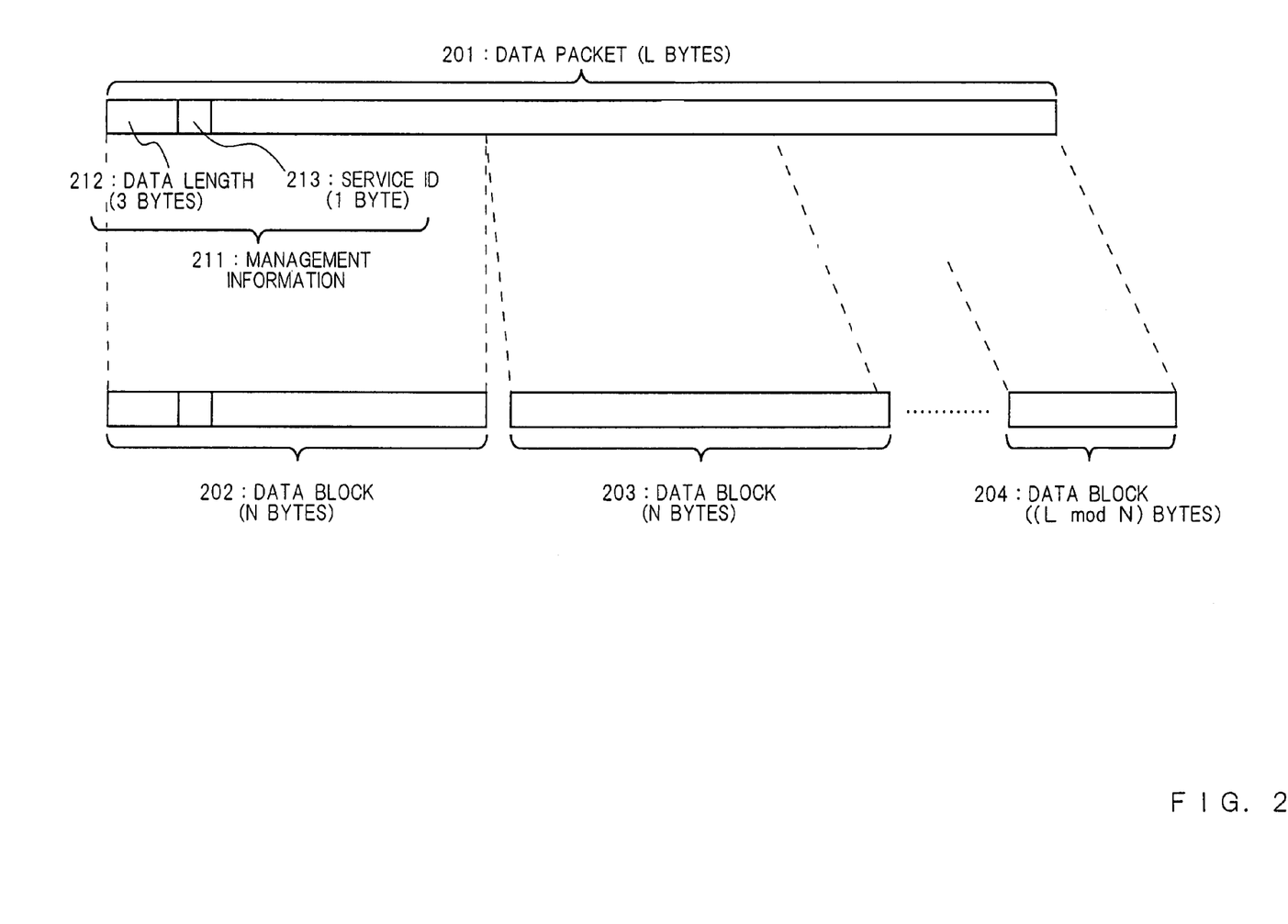
FIG. 2 is a block diagram of a data packet in accordance with the embodiment of the present invention.

FIG. 2 shows the configuration of a data packet in accordance with the embodiment of the present invention. The data length of a data packet 201 (a SD I/O Bluetooth standard) which is sent and received between the data transmission apparatus 101 and the IC card 102 is assumed as L bytes. The value of L varies corresponding to the content of the data. The management information 211 of 4 bytes is allocated at the forefront of the data packet 201. The management information 211 includes information regarding the data packet length 212 (3 bytes) and a service ID (Identification) 213 (1 byte). The Service ID 213 can include information regarding data types. In the data packet 201, the entire portions except the management information 211 are a normal data. In addition, "data length" is also an arbitrary value to indicate the amount of information of a data packet (number of bytes, in the embodiment).

Data blocks 202 through 204 that were made by dividing a data packet 201 are sent and received between the data transmission apparatus 101 and the IC card 102. The data transmission apparatus 101 determines the maximum data size (N bytes) of the data blocks 202 through 204 which are sent and received to/from the IC card 102, at the time when the IC card 102 is initialized, at the time of connection or on start up of the IC card 102, in accordance with the following method.

Figure 3:
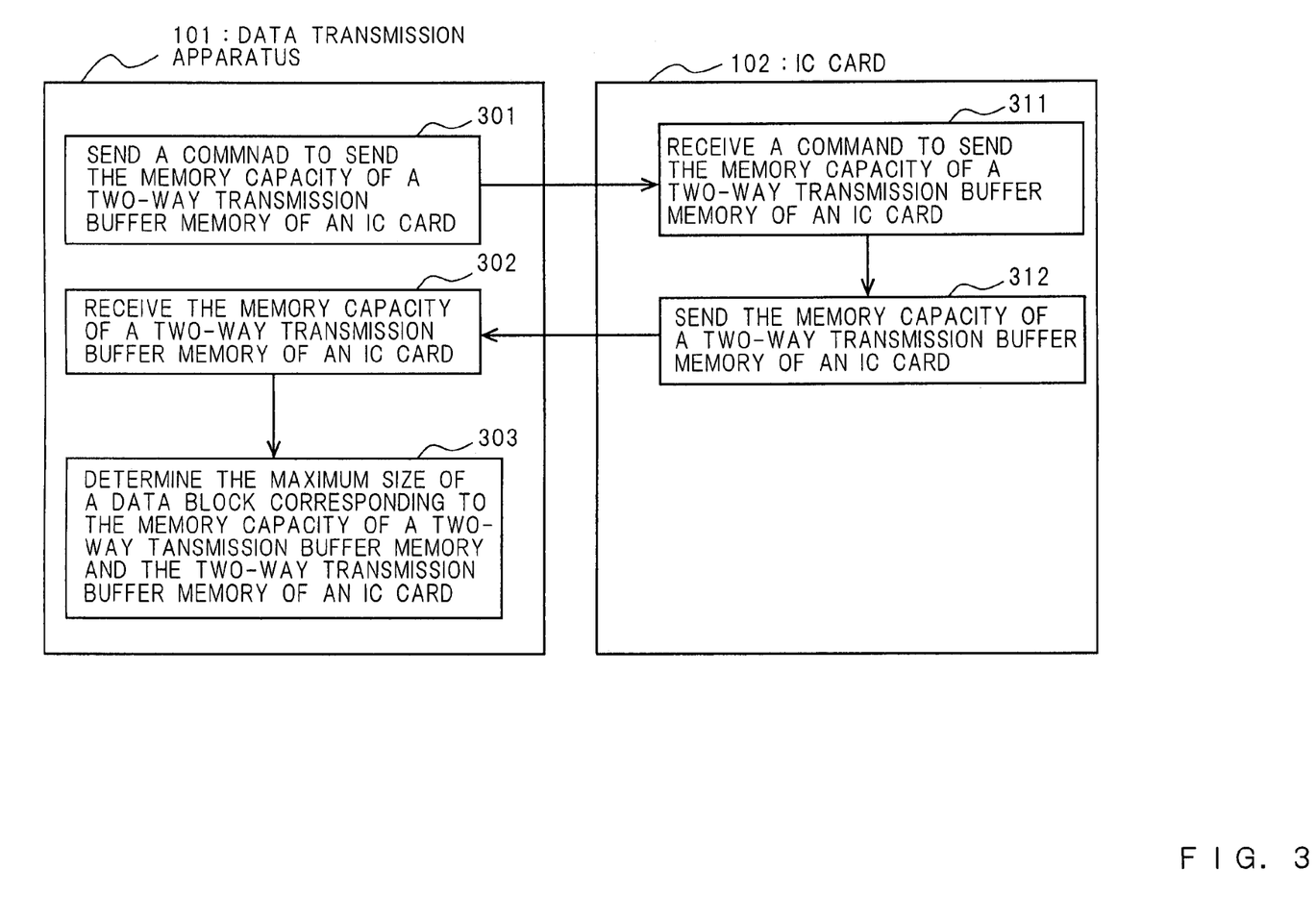
FIG. 3 is a flowchart showing the method of determining the maximum size of a data block being sent and received between a data transmission apparatus and an IC card.

FIG. 3 is a flowchart showing the method of determining the maximum size of a data block being sent and received between a data transmission apparatus 101 and an IC card 102. The data transmission apparatus 101 sends the IC card 102 a command inquiring the memory capacity of a buffer memory for a two-way transmission 123 of the IC card 102 in step 301. The IC card 102 receives the command inquiring the memory capacity of a buffer memory for a two-way transmission 123 of the IC card 102 in step 311. The IC card 102 sends the memory capacity of the buffer memory for a two-way transmission 123 to the data transmission apparatus 101 in step 312. The data transmission apparatus 101 receives the memory capacity of the buffer memory for a two-way transmission 123 of the IC card 102 in step 302. The data transmission apparatus 101 determines the value that does not exceed the memory capacity of the buffer memory for a two-way transmission 123 of the IC card 102 and the memory capacity of the buffer memory for a two-way transmission 113 of the data transmission apparatus 101 as the maximum size (N bytes) of a data block in step 303.

When the data length of a data packet 201 is L bytes, and the maximum size of a data block is N bytes (FIG. 2), the data packet 201 is typically divided into data blocks 202 through 204 which have a data length of N bytes. The data length of the last data block 204 is a remainder after dividing L bytes by N bytes ($0 \leq$ (L mod N)$<$N) (when (L mod N)=0, the data length of the last data block 204 becomes N bytes.). The dividing/synthesis of the data packet 201 is executed by the block dividing/synthesis section 131 of the data transmission apparatus 101 or by the block dividing/synthesis section 141 of the IC card 102.

The management information 211 is allocated at the predetermined location (at the foremost, in the embodiment) of the foremost data block 202. The data transmission apparatus 101 or the IC card 102 which received the foremost data block 202 extracts the data length of the whole data packet 201 from the management information 211, in the management information processing section 133 or the management information processing section 143. The data transmission apparatus 101 or the IC card 102 can judge the presence or absence of data which is not received, from the data length of the whole data packet 201 and the whole data length of the data blocks that are already received, along with sequentially receiving a data block.

The IC card 102 can store the data blocks 202 through 204 having a data length that is equal to or smaller than the maximum size in its buffer memory for a two-way transmission 123. Since the data length of the data blocks 202 through 204 (N bytes) corresponds to the memory capacity of the buffer memory for a two-way transmission 113 of the data transmission apparatus 101, data transmission to/from the IC card 102 is possible without fail even in a data transmission apparatus in which the memory capacity of the buffer memory for a two-way transmission 113 is small. In regard of a data transmission apparatus in which the memory capacity of the buffer memory for a two-way transmission 113 is large, a data transmission rate which is effectually high can be realized.

Parenthetically, in regard to FIG. 2, all the data length except that of the last data block 204 was a maximum size (N bytes), but the data length of each data block may be equal to or smaller than the maximum size.

In regard to the embodiment (FIG. 3), the maximum size of a data block (N bytes) was determined corresponding to the memory capacity of the buffer memory for a two-way transmission 113 of the data transmission apparatus 101 and the memory capacity of the buffer memory for a two-way transmission 123 of the IC card 102. But the maximum size of a data block may be determined corresponding to the maximum size of a data block which the data transmission apparatus 101 and the IC card 102 are capable of sending and receiving. In such case, it only needs to replace "the memory capacity of a buffer memory for a two-way transmission"

with "the maximum size of a data block that is capable of being sent and received" in all steps of FIG. 3.

<<Data Transmission Process from an IC Card to a Data Transmission Apparatus>>

A data transmission process from an IC card to a data transmission apparatus will be described with reference to FIG. 4 and FIG. 5.

Figure 4:
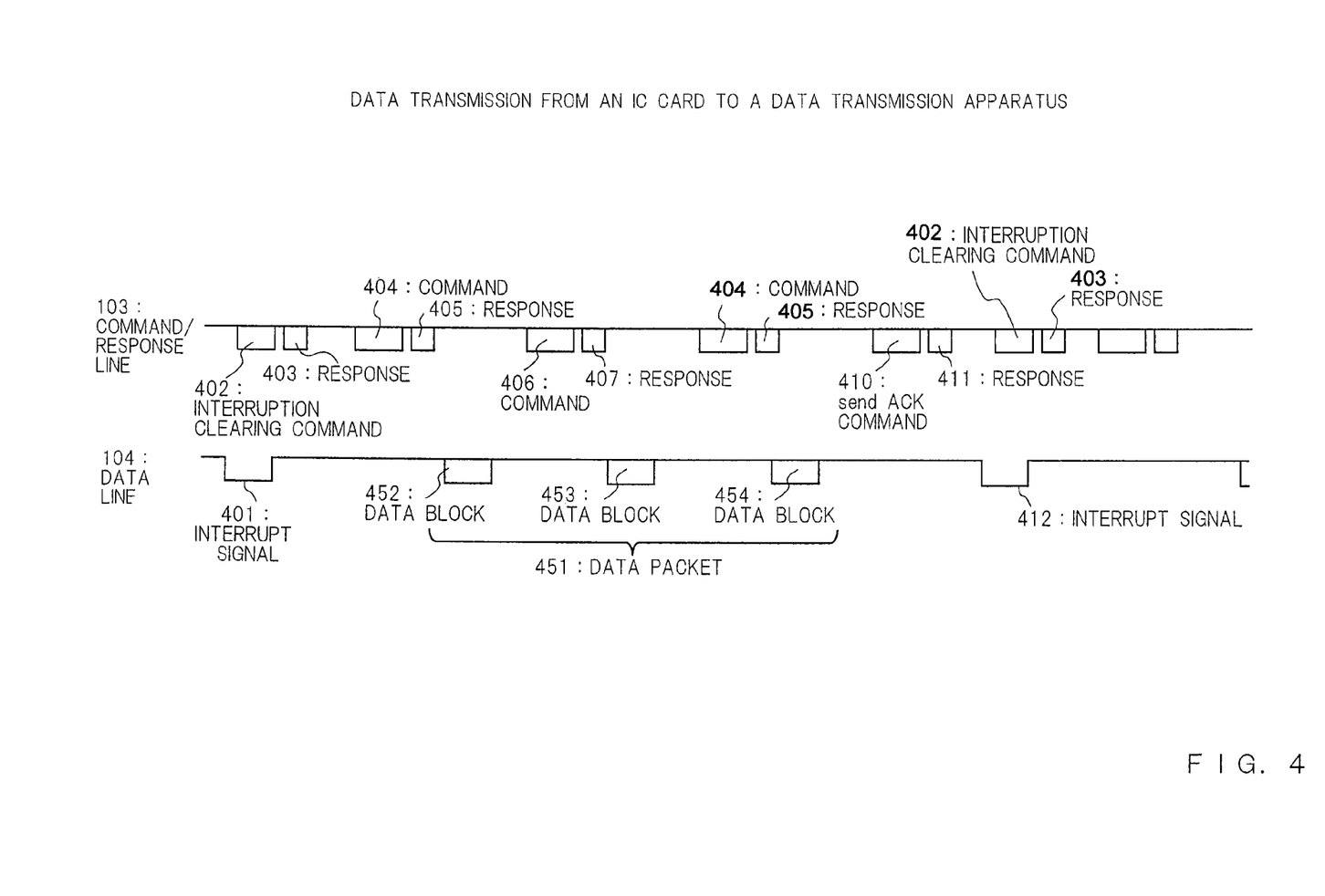
FIG. 4 shows a brief overview of a data transmission process from an IC card to a data transmission apparatus.

FIG. 4 shows a brief overview of a data transmission process from an IC card to a data transmission apparatus. Between the data transmission apparatus 101 and the IC card 102, the command from the data transmission apparatus 101 and the response from the IC card 102 are sent and received through the command/response line 103. The data block and the interrupt signal which the IC card 102 outputted are transmitted to the data transmission apparatus 101 through a data line 104.

The IC card 102 is assumed as functioning effectively (in a state where a data block can be sent and received) at this point of time. The external communication module 124 of an IC card 102 receives a data packet (a data packet of a Bluetooth standard, in the embodiment) by a radio communication through an antenna 106, and transmits it to the buffer memory 144. Furthermore, a single data packet 451 to be sent to the data transmission apparatus 101 (a data packet of a SD I/O Bluetooth standard. It corresponds to the data packet 201 of FIG. 2.) is generated from the data packet in the buffer memory 144, in the controlling section 121 of the IC card 102. The controlling section 121 judges whether the data volume in the buffer memory 144 has reached the pre-determined volume or not.

When the data volume in the buffer memory 144 reaches the pre-determined volume, the interrupt signal generating section 142 of the IC card 102 sends an interrupt signal 401 to the data transmission apparatus 101 through the data line 104. The interrupt signal detecting section 132 of the data transmission apparatus 101 detects the interrupt signal 401. The data transmission apparatus 101 acknowledges that the IC card 102 is demanding a data transmission. The data transmission apparatus 101 sends an interruption clearing command 402 to the IC card 102. The IC card 102 stops the interrupt signal 401 after receiving the interruption clearing command 402, and returns the response 403.

Subsequently, the data transmission apparatus 101 sends a command 404 to start the transmission of a data block to the IC card 102, and receives the response 405 from the IC card 102. The command 404 includes information of a data length (amount of information) of the first data block 452. The data length of the first data block 452 is equal to or smaller than the data length of the maximum size of a data block (for example, N bytes in FIG. 2) which is pre-determined at the time when the data transmission apparatus 101 initializes the IC card, at the time of connection or on startup of the IC card 102.

The block dividing/synthesis section 141 of the IC card 102 divides the data packet 451 to generate the data block 452 having the data length designated by the command 404, and stores it in the buffer memory for a two-way transmission 123. Thereafter, the IC card 102 sends the first data block 452 through the data line 104.

The data transmission apparatus 101 sends the command 406 to start the transmission of the next data block 453 after normally receiving the data block 452, and receives the response 407 from the IC card 102. The command 406 includes information of a data length (amount of information) of the second data block 453. The data length of the second data block 453 is equal to or smaller than the data length of the maximum size of a data block (for example, N bytes in FIG. 2).

The block dividing/synthesis section 141 of the IC card 102 divides the data packet 451 to generate the data block 453 having the data length designated by the command 406, and stores it in the buffer memory for a two-way transmission 123. Thereafter, the IC card 102 sends the second data block 453 through the data line 104.

A similar procedure is repeated to the remaining data blocks. The data transmission apparatus 101 which received the foremost data block 452 extracts the data length of the whole data packet 451 from the management information included in the data block 452, in the management information processing section 133. The data transmission apparatus 101 judges the presence or absence of a data which is not received, from the data length of the whole data packet 451 and the whole data length of the data blocks that are already received, judges whether data transmission is finished or not (whether to send the command to start the transmission of the next data block or not), along with sequentially receiving data blocks 453 and 454.

When the transmission of all the data blocks 452 through 454 composing the data packet 451 is finished normally, the data transmission apparatus 101 sends a send ACK command 410, and notifies the IC card that the data transmission finished normally. As a response to this command, the IC card 102 returns the response 411. By procedures as above-mentioned, the transmission of the first data packet 451 finishes. When the IC card 102 sends a data packet next off, the interrupt signal 412 is sent again, and repeats the same procedures as the transmitting procedures of the previous data packet 451.

Hence, from the above description, when the data transmission apparatus 101 receives a plurality of data blocks composing a data packet from the IC card 102, it does not notify the IC card 102 that individual data block was received normally while the data block is normally received. It will notify the IC card 102 that the whole data packet was normally received (send ACK command 410) at the time when all the data blocks composing the data packet were received normally.

The IC card 102 sends an interrupt signal 401 only when a data block including management information, in other words, the first data block in the data packet is to be sent, and does not send an interrupt signal 401 when any other data block is to be sent. Therefore, data packet can be transmitted quickly from the IC card 102 to the data transmission apparatus 101 even when the processing capability of the data transmission apparatus 101 is low.

Figure 5:
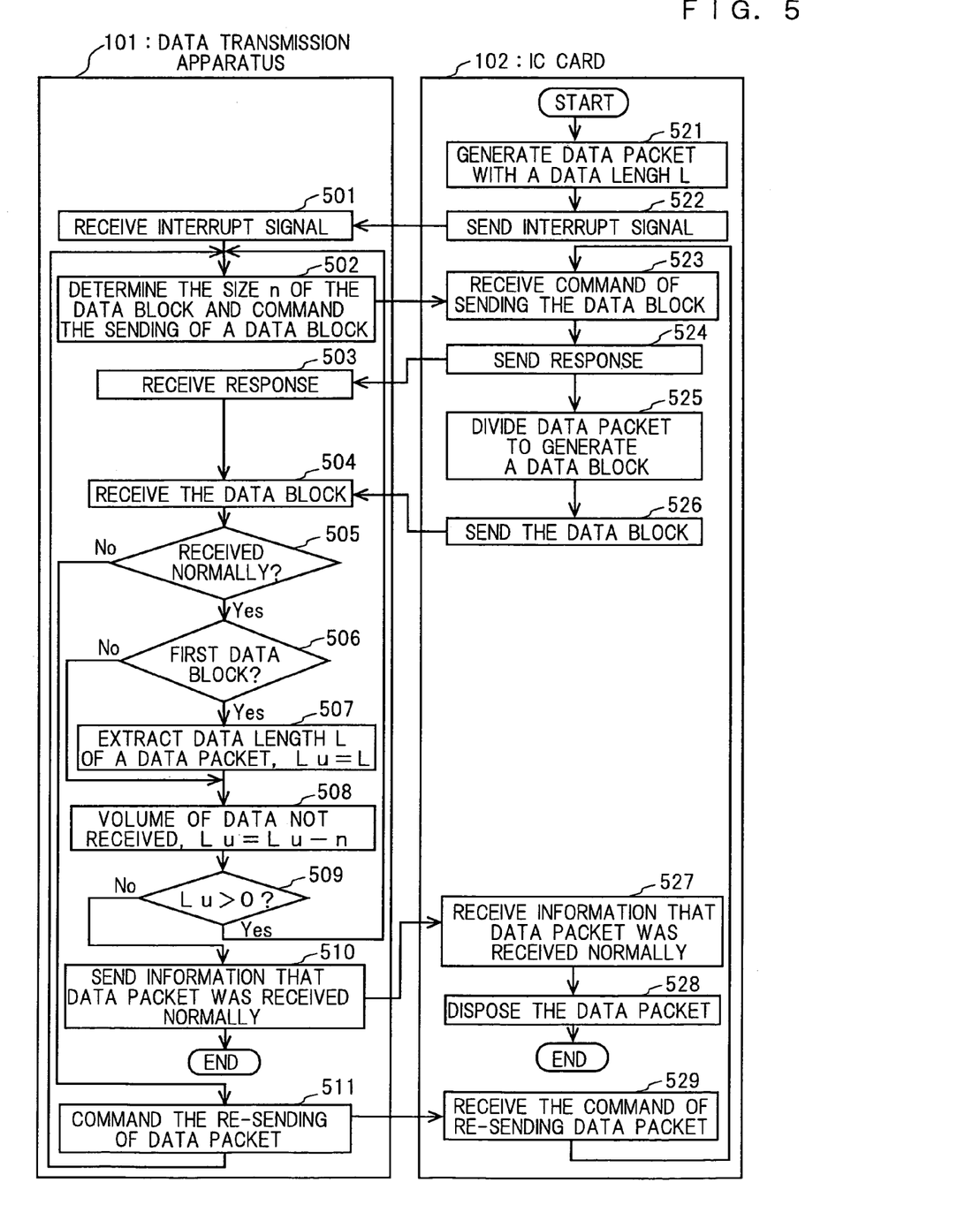
FIG. 5 is a flowchart of a data transmission when data is transmitted from an IC card to a data transmission apparatus, and the data transmission apparatus reads out the data from the IC card.

FIG. 5 is a flowchart of a data transmission when data is transmitted from an IC card 102 to a data transmission apparatus 101, and the data transmission apparatus 101 reads out the data from the IC card 102.

The IC card 102 generates a data packet in step 521. Namely, the controlling section 121 of the IC card 102 converts the data packet of a Bluetooth standard which is transmitted from the external communication function module 124 to the buffer memory 144 into a data packet of a SD I/O Bluetooth standard (data packet 451 of FIG. 4) to be transmitted to the data transmission apparatus 101. The data length of a converted data packet is assumed as L bytes. The interrupt signal generating section 142 sends the interrupt signal (interrupt signal 401 of FIG. 4) to the data transmission apparatus 101 in step 522.

The interrupt signal detecting section 132 of the data transmission apparatus 101 receives the interrupt signal in step

501. The data transmission apparatus 101 commands the IC card 102 to send a data block in step 502. This command includes the data length n of a data block to be received from an IC card. The data length n of a data block is equal to or smaller than the data length of the maximum size of a data block (for example, N bytes in FIG. 2) which was pre-determined by the data transmission apparatus 101. The IC card 102 receives a command to send a data block (step 523), and sends a response (step 524). The data transmission apparatus 101 receives the response (step 503).

Following on step 524, the block dividing/synthesis section 141 of the IC card 102 divides the data packet to generate a data block having a data length n, in step 525. The IC card 102 temporarily stores the data block in the buffer memory for a two-way transmission 123, and sends it to the data transmission apparatus 101 in step 526.

Following on step 503, the data transmission apparatus 101 receives a data block, temporarily stores it in the buffer memory for a two-way transmission 113, and transmits it to the buffer memory 134, in step 504. The data transmission apparatus judges whether the data block was received normally in step 505. When the data transmission apparatus could not normally receive the data block, it commands the IC card 102 to re-send a data packet in step 511, returns to step 502 and commands to send a data block. The IC card 102 interrupts the transmission of the remaining data block after receiving the command to re-send the data packet (step 529), and returns to step 523. The IC card 102 re-sends from the first data block when it receives the command to send the data block.

When judged as normally receiving the data block in step 505, it proceeds to step 506. The data transmission apparatus 101 judges whether the received data block is the first data block or not, in step 506. The data transmission apparatus 101 judges that the primarily received data block after receiving the interrupt signal (step 501) or after sending the command to re-send the data packet (step 511) is the foremost data block among the data blocks which compose the data packet. When the received data block is the second data block or later, it proceeds to step 508. When the received data block is the first data block, the management information processing section 133 extracts the data length of the data packet (L bytes) from the management information allocated in the forefront of that data block, in step 507. Furthermore, L is substituted for the volume Lu of data which is not received. It proceeds to step 508. The data transmission apparatus calculates volume Lu of data which is not received in step 508 (Lu=Lu−n). The data transmission apparatus 101 judges whether the volume Lu of data which is not received is larger than 0 or not, in step 509. When the volume Lu of data which is not received is larger than 0, it returns to step 502, and sends the command to send the next data block. In other words, it repeats the receiving process of the data block.

When the volume Lu of data which is not received is 0, in other words, when all the data blocks have finished being received normally in step 509, it proceeds to step 510. The data transmission apparatus 101 sends the IC card 102 information that the data packet was normally received (send ACK command 410 of FIG. 4) in step 510, and it finishes the flowchart of the data transmission apparatus 101. The block dividing/synthesis section 131 synthesizes the data packet (an SD I/O Bluetooth standard) after all the data blocks are transmitted to the buffer memory 134.

When all the data blocks have finished being sent, the IC card 102 receives information that the data packet was normally received (send ACK command 410 of FIG. 4) from the data transmission apparatus 101 in step 527. The data packet in the buffer memory 144 (data packet which is generated in step 521) is disposed in step 528, and it finishes the flowchart of the IC card 102. In addition, when a command other than the command to send the data packet is received from the data transmission apparatus 101, the data packet in the buffer memory 144 is disposed, and the flowchart of the IC card 102 is finished.

The IC card 102 does not dispose the data blocks from the buffer memory 144 until the transmission of all the data blocks composing the data packet are normally sent. Therefore, a data block can be re-sent immediately.

Parenthetically, a flowchart excluding step 510, step 527 and step 528 may be executed as a replacement of a flowchart of FIG. 5. Namely, there is no need to send information that the data transmission apparatus 101 normally received a data packet to an IC card. Furthermore, the IC card 102 may store the data packet which was sent to the data transmission apparatus 101 in the buffer memory 144 without disposing it, or execute an overwriting process at the next data packet.

<<Data Transmission Process from a Data Transmission Apparatus to an IC Card>>

Subsequently, the method of data transmission process from the data transmission apparatus 101 to the IC card 102 will be described with reference to FIG. 6 and FIG. 7.

Figure 6:
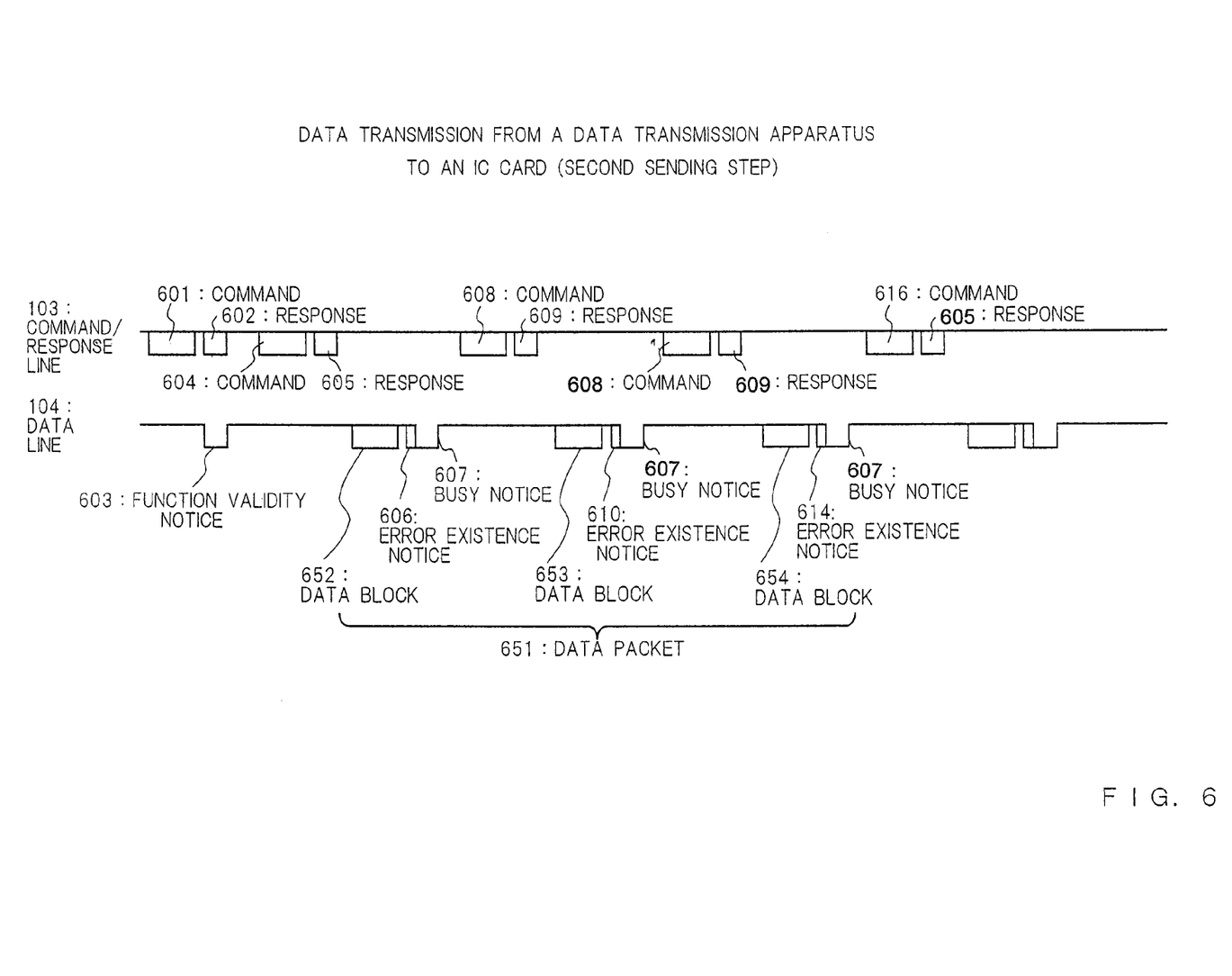
FIG. 6 shows a brief overview of a data transmission process from a data transmission apparatus to an IC card.

FIG. 6 shows a brief overview of a data transmission process from a data transmission apparatus to an IC card.

The IC card 102 is not functioning on startup. To start with, the data transmission apparatus 101 sends a command 601 to effectively operate the function of the IC card 102. After the IC card 102 starts to operate the function (becomes valid), the IC card executes a function validity notice 603 through the data line 104 along with returning the response 602. Hereafter, the IC card 102 functions effectively unless a reset command from the data transmission apparatus 101 is inputted.

Subsequently, the data transmission apparatus 101 generates a single data packet 651 (a SD I/O Bluetooth standard. It corresponds to the data packet 201 of FIG. 2.) to be transmitted to the IC card 102, from the data packet in the buffer memory 134 (a Bluetooth standard). The block dividing/synthesis section 131 generates the first data block 652 from that data packet 651. The data transmission apparatus 101 sends the IC card 102 a command 604 (includes information of a data length of the first data block 652) to start the transmission of a data block, and receives the response 605 from the IC card 102. Thereafter, the data transmission apparatus 101 temporarily stores the first data block 652 in the buffer memory for a two-way transmission 113, and sends it.

The IC card executes an error existence notice 606 through the data line 104. The error existence notice 606 includes information of whether the prior data block 652 was normally sent or not.

Since the IC card 102 can not receive the next data block while processing the received data block 652, it executes a busy notice 607 following on the error existence notice 606 through data line 104.

After the busy notice 607 is finished, the data transmission apparatus 101 sends the IC card 102 a command 608 (includes information of data length of the next data block 653) to send the next data block 653, and receives the response 609 from the IC card 102. Thereafter, the data transmission apparatus 101 temporarily stores the next data block 653 in the buffer memory for a two-way transmission 113, and sends it. A similar procedure is repeated to the remaining data blocks.

Thus, all the data blocks 652 through 654 composing the data packet 651 are sent. When the data transmission apparatus 101 sends the data packet next off, it once again sends the command 616 to start the transmission of the data block, and repeats the same procedures as the transmitting procedures of the previous data packet 651.

The IC card 102 which received the foremost data block 652 extracts the data length of the whole data packet 651 from the management information included in the data block 652, in the management information processing section 143. The IC card 102 judges the presence or absence of a data block which is not received from the data length of whole data packet 651 and the total data length of the data blocks which are already received, along with sequentially receiving the data blocks 653 and 654, and judges whether the data transmission is finished or not.

As per mentioned above, the data transmission apparatus 101 can transmit a data packet to the IC card 102 quickly since the data transmission apparatus does not send the IC card 102 a command to confirm whether the previous data block was normally transmitted or not.

Parenthetically, the data length of each of data blocks 652 through 654 is equal to or smaller than the data length of the maximum size of a data block (for example, N bytes in FIG. 2) which is pre-determined by the data transmission apparatus 101.

Figure 7:
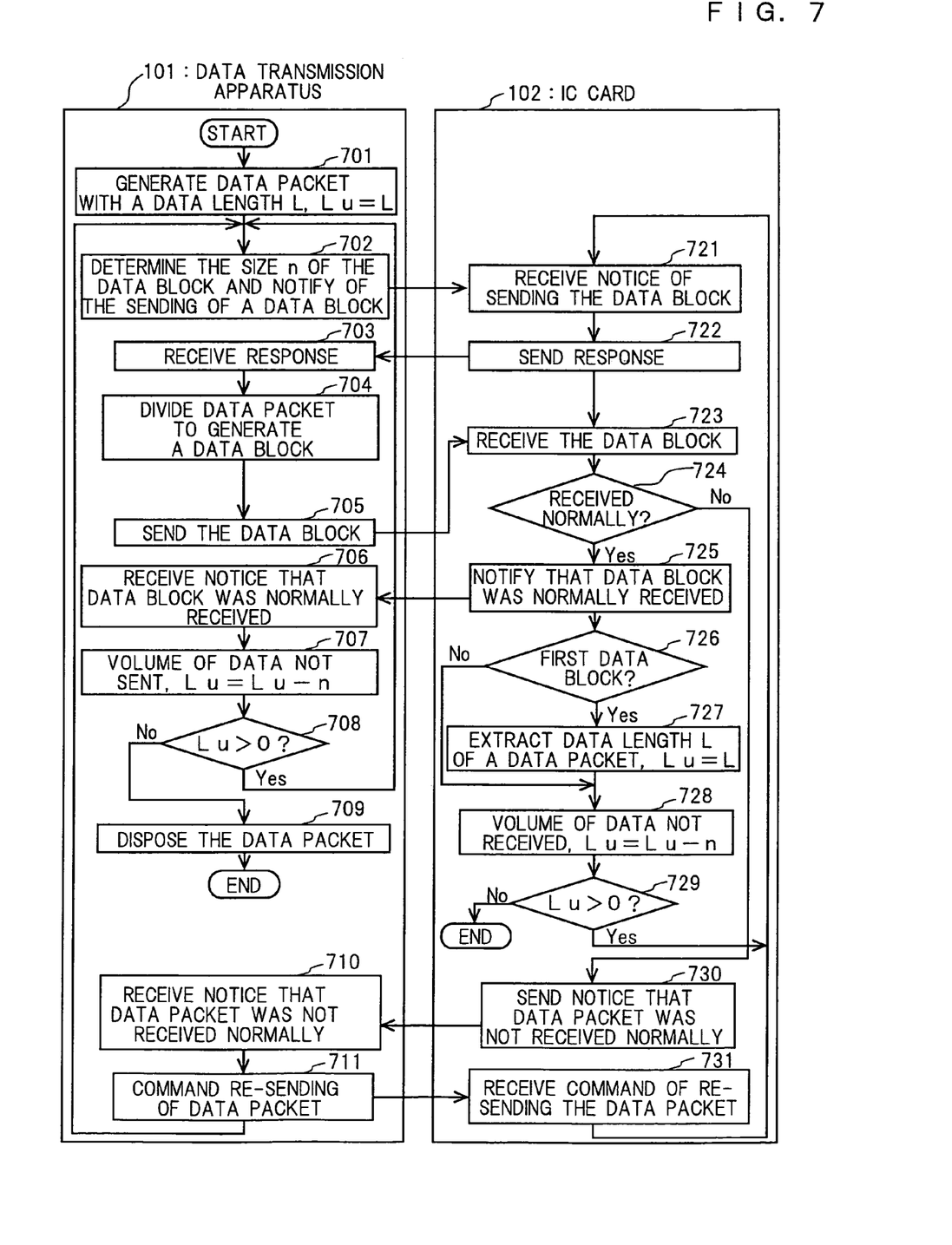
FIG. 7 is a flowchart of a data transmission when data is transmitted from a data transmission apparatus to an IC card, and the data transmission apparatus writes the data onto the IC card.

FIG. 7 is a flowchart of a data transmission when data is transmitted from a data transmission apparatus to an IC card, and the data transmission apparatus writes the data onto the IC card.

The data transmission apparatus 101 generates a data packet (a SD I/O Bluetooth standard. for example, a data packet 201 of FIG. 2, a data packet 651 of FIG. 6) to be sent to the IC card 102 from a data packet (a Bluetooth standard) which is stored in the buffer memory 134, in step 701. The data length of a data packet is assumed as L bytes. L is substituted for the volume Lu of data which is not received. The data transmission apparatus 101 notifies the IC card 102 of sending a data block in step 702. In this notice, the data length n of a data block to be sent to the IC card 102 is included. The data length n of a data block is equal to or smaller than the maximum size of the data block (for example, N bytes in FIG. 2) which was pre-determined by the data transmission apparatus 101. The IC card 102 receives a notice of sending a data block (step 721), and sends the response (step 722). The data transmission apparatus 101 receives the response (step 703). The block dividing/synthesis section 131 divides the data packet to generate a data block with a data length n, in step 704.

Following on step 704, the data transmission apparatus 101 temporarily stores the data block in the buffer memory for a two-way transmission 113, and sends it, in step 705.

Following on step 722, the IC card 102 receives the data block, temporarily stores it in the buffer memory 123, and sends it to the buffer memory 144, in step 723. It judges whether the data block was normally received of not, in step 724. It proceeds to step 730 when it could not receive the data block normally, and notifies the data transmission apparatus 101 that the data block was not normally received. It proceeds to step 725 when it received the data block normally, and it sends the data transmission apparatus 101 the notice that the data block was normally received. It proceeds to step 726. More specifically, the IC card 102 make the notice include the information of whether the data block was normally received or not at the time of the error existence notice (error existence notice 606, 610 and 614 of FIG. 6) after receiving the data block.

The IC card 102 judges whether the data block received in step 723 is the first data block, in step 726. The IC card 102 judges that the data block which was primarily received after a valid operation starts, or after normally receiving all the data blocks that compose the data packet, or after sending the command to re-send the data blocks (step 731) is the foremost data block among the data blocks composing the data packet. When the data block is a second data block or later, it proceeds to step 728. When the data block is the first data block, the management information processing section 143 extracts the management information from the foremost of the data block, obtains the information of the data length (L bytes) of the data packet, and substitutes L for the volume Lu of data which is not received (step 727). It proceeds to step 728. The IC card 102 calculates the volume Lu of data which is not received, in step 728 (Lu=Lu−n).

The IC card 102 judges whether the volume Lu of data which is not received is larger than 0 or not, in step 729. When Lu is larger than 0, it returns to step 721 and receives a notice of sending the next data block. In other words, process of receiving the data block is repeated.

When volume Lu of data which is not received is 0 in step 729, in other words, when all the data blocks have finished being received, the flowchart of the IC card 102 is finished. The block dividing/synthesis section 141 synthesizes the data packet (a SD I/O Bluetooth standard) after all the data blocks are sent to the buffer memory 144.

On the other hand, the data transmission apparatus 101 receives a notice that the IC card 102 received the data block normally, in step 706. The data transmission apparatus 101 calculates the volume Lu of the data which is not sent, in step 707 (Lu=Lu−n). The data transmission apparatus 101 judges whether the volume Lu of the data which is not sent is larger than 0 or not. When Lu is larger than 0, it returns to step 702, and notifies the IC card of sending the next data block. In other words, process of sending the data block is repeated.

When the volume Lu of data which is not sent is 0 in step 708, in other words, when all the data blocks have finished being sent, it proceeds to step 709. The data packet in the memory buffer 134 (data packet generated in step 701) is disposed in step 710, and the flowchart of the data transmission apparatus 101 is finished.

When the transmission of a data block in midway fails, the transmission of the remaining data blocks are canceled, and re-sending of all the data blocks is executed. The data transmission apparatus 101 receives a notice that the IC card 102 did not receive the data block normally, in step 710. It commands to re-send the data packet in step 711, and returns to step 702. The data transmission apparatus 101 re-sends from the first data block. On the other hand, the IC card 102 receives the command to re-send the data packet in step 731, and returns to step 721. The IC card 102 receives from the first data block again.

By loading a program for executing the above-mentioned method, for example, into a PC, an audiovisual equipment, or a microcomputer which is built into a cellular phone, and executing it, these apparatus can be operative as a data transmission apparatus of the present invention. By loading a program for executes the above-mentioned method, for example, into a microcomputer which is built in an IC card such as an SD card, memory stick or the like, and executing it, these apparatus can be operative as an IC card of the present invention.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The present invention is useful as an IC card which is mounted on a data transmission apparatus and sends and receives a data packet to/from a data transmission apparatus, as a method of data transmission of that IC card, and as a computer program of data transmission method.

The present invention is useful as a data transmission apparatus which mounts an IC card and sends and receives a data packet to/from an IC card, and as a method of data transmission of that data transmission apparatus, and as a computer program of data transmission method.

The invention claimed is:

1. An IC card comprising:
a controlling section which generates a data packet by adding management information including information regarding data length of the data packet, and which generates data blocks by dividing said data packet wherein a data length of the data block is designated from a data transmission apparatus; and
a communicating section which sends an interrupt signal to said data transmission apparatus when said data block which includes said management information is to be sent, and does not send said interrupt signal to said data transmission apparatus when a data block which does not include said management information is to be sent, in a case where a plurality of said data blocks, which compose said data packet, are sent to said data transmission apparatus.

2. The IC card in accordance with claim 1, wherein said controlling section makes the foremost data block include said management information in a case where a plurality of said data blocks, which compose said data packet, are sent to said data transmission apparatus.

3. The IC card in accordance with claim 1, wherein said IC card disposes said sent data packet after receiving information of normally receiving all said data blocks which compose said data packet from said data transmission apparatus, or after receiving a command other than a command of sending said data packet from said data transmission apparatus in a case where said data packet, which is divided into a plurality of said data blocks, is sent to said data transmission apparatus.

4. A data transmission apparatus comprising:
a communicating section which sends and receives a data block to/from an IC card; and
a controlling section, in a case where a plurality of said data blocks created by dividing a data packet are received from the IC card, which extracts management information including information regarding a data length of said data packet from a pre-determined portion of said data block which is primarily received after said communicating section receives an interrupt signal, and which treats whole said data block as a data that does not include said management information when said data block is received at other timing.

5. The data transmission apparatus in accordance with claim 4, further comprising a buffer memory for a two-way transmission which stores said data block that is sent and received to/from said IC card;
said communicating section receives the information of the maximum size of the data block which said IC card can send and receive before said data block is sent and received to/from said IC card; and
said controlling section determines a maximum size of said data block corresponding to said buffer memory for a two-way transmission and the maximum size of the data block which said IC card can send and receive, and commands said IC card to send said data blocks with a data length that is equal to or smaller than the maximum size of said data block through said communicating section in a case where the plurality of said data blocks are received from said IC card wherein the data blocks are created by dividing said data packet.

6. The data transmission apparatus in accordance with claim 4, wherein said controlling section judges whether all said data blocks are received or not based on the information regarding the data length of said data packet included in said extracted management information, and commands said IC card to send said data block when there is said data block which has not been received, in a case where a plurality of data blocks created by dividing said data packet are received from said IC card.

7. The data transmission apparatus in accordance with claim 4, wherein said controlling section does not notify said IC card individually that each of said data blocks has been received normally when said data block is received normally, but notifies said IC card that said communicating section has normally received the whole data packet at the time when all of said data blocks which compose the data packet were normally received, in a case where said communicating section receives a plurality of data blocks which compose said data packet from said IC card.

8. The data transmission apparatus in accordance with claim 4, wherein said controlling section, when said communicating section detects an error from the data block which said IC card has sent, cancels the transmission of the remaining data block belonging to the same data packet, and sends said IC card a command to re-send that data packet.

9. A data transmission method for sending a data packet to a data transmission apparatus comprising:
a generating step of generating a data packet by adding management information including information regarding a data length of the data packet, and of generating data blocks by dividing said data packet wherein a data length of the data block is designated from the data transmission apparatus;
a first sending step of sending an interrupt signal to said data transmission apparatus, and thereafter sending said data block including said management information, and
a second sending step of sending a data block which does not include said management information without sending said interrupt signal.

10. The data transmission method in accordance with claim 9, wherein said management information is included in the foremost data block in said generating step.

11. The data transmission method in accordance with claim 9 further comprising a disposing step of disposing said sent data packet after receiving information of normally receiving all said data blocks which compose said data packet from said data transmission apparatus, or after receiving a command other than a command of sending said data packet from said data transmission apparatus, in a case where said data packet, which is divided into a plurality of said data blocks, is sent to said data transmission apparatus.

12. A data transmission method for sending a data packet to/from an IC card comprising:
an interrupt signal receiving step of receiving an interrupt signal from said IC card;

a receiving step of sequentially receiving a plurality of data blocks which compose said data packet after said interrupt signal receiving step; and a data processing step of extracting management information including information regarding a data length of said data packet from the pre-determined portion of said data block which is primarily received after said interrupt signal receiving step in a plurality of said data blocks, and of treating said data block which was received at other timing as a data that does not include said management information.

13. The data transmission method in accordance with claim 12 further comprising:

a maximum size information receiving step of receiving information of the maximum size of the data block that said IC card can send and receive;

a maximum size determining step of determining a maximum size of said data block corresponding to the buffer memory for a two-way transmission which stores said data block that is sent and received to/from said IC card and the maximum size of a data block which said IC card can send and receive; and a send data block commanding step of commanding said IC card to send said data blocks with a data length that is equal to or smaller than the maximum size of said data block.

14. The data transmission method in accordance with claim 12 further comprising: a judging step of judging whether all said data blocks were received or not based on the information regarding the data length of a data packet included in said extracted management information; and a commanding step of commanding said IC card to send said data block when there is said block which has not been received in a case where a plurality of data blocks created by dividing said data packet are received from said IC card.

15. The data transmission method in accordance with claim 12 further comprising a notifying step not of notifying said IC card individually that each of said data block has been normally received when said data block is receiving normally, but of notifying said IC card that the whole data packet has been normally received at the time when all of said data blocks which compose the data packet were normally received, in a case where a plurality of data blocks which compose said data packet are received from said IC card.

16. The data transmission method in accordance with claim 12 further comprising a re-send commanding step of canceling the transmission of the remaining data block belonging to the same data packet when an error is detected from the data block which said IC card has sent, and of sending said IC card a command to re-send that data packet.

17. A computer program embodied in a computer readable media for a data transmission method of making an IC card having a built-in computer which sends a data packet to a data transmission apparatus, execute:

a generating step of generating the data packet by adding management information including information regarding a data length of the data packet, and of generating data blocks by dividing said data packet wherein a data length of the data block is designated from the data transmission apparatus;

a first sending step of sending an interrupt signal to said data transmission apparatus, and thereafter sending said data block including said management information; and a second sending step of sending a data block which does not include said management information without sending said interrupt signal.

18. A computer program embodied in a computer readable media for a data transmission method of making a data transmission apparatus having a built-in computer which receives a data packet from an IC card, execute:

an interrupt signal receiving step of receiving an interrupt signal from said IC card;

a receiving step of sequentially receiving a plurality of data blocks which compose said data packet after said interrupt signal receiving step; and a data processing step of extracting management information including information regarding a data length of said data packet from the pre-determined portion of said data block which is primarily received after said interrupt signal receiving step in a plurality of said data blocks, and of treating whole said data block which was received at other timing as a data that does not include said management information.

* * * * *